United States Patent [19]

Gruhle et al.

[11] Patent Number: 5,748,472
[45] Date of Patent: May 5, 1998

[54] PROCESS FOR CONTROLLING AN AUTOMATIC GEARBOX

[75] Inventors: Wolf Dieter Gruhle, Tettnang; Manfred Escher, Kressbronn; Friedemann Jauch, Meckenbeuren; Friedrich Reiter; Peter Wendel, both of Kressbronn, all of Germany

[73] Assignee: ZF Friedrichshafen AG, Friedrichshafen, Germany

[21] Appl. No.: 549,843

[22] PCT Filed: Apr. 18, 1994

[86] PCT No.: PCT/EP94/01189

§ 371 Date: Oct. 17, 1995

§ 102(e) Date: Oct. 17, 1995

[87] PCT Pub. No.: WO94/24464

PCT Pub. Date: Oct. 27, 1994

[30] Foreign Application Priority Data

Apr. 20, 1993 [DE] Germany ............... 43 12 717.7

[51] Int. Cl.⁶ .................. B60K 41/20; F16H 61/02
[52] U.S. Cl. .................. 364/424.08; 364/424.084; 364/424.086; 364/424.094; 477/43; 395/905
[58] Field of Search .......... 364/424.08, 424.083, 364/424.084, 424.085, 424.089, 424.074, 424.095, 424.086; 477/120, 155, 43; 395/900, 905, 913

[56] References Cited

U.S. PATENT DOCUMENTS

| | | | |
|---|---|---|---|
| 3,684,066 | 8/1972 | Kubo et al. | 477/901 |
| 4,584,906 | 4/1986 | Nagaoka et al. | 477/120 |
| 4,630,508 | 12/1986 | Klatt | 364/424.083 |
| 4,862,854 | 9/1989 | Oda et al. | 123/399 |
| 5,035,160 | 7/1991 | Morita | 477/154 |
| 5,157,609 | 10/1992 | Stehle et al. | 364/424.085 |
| 5,182,710 | 1/1993 | Tomisawa | 364/424.085 |
| 5,189,621 | 2/1993 | Onari et al. | 364/431.04 |
| 5,474,505 | 12/1995 | Seidel et al. | 447/49 |
| 5,510,982 | 4/1996 | Ohnishi et al. | 477/120 |

FOREIGN PATENT DOCUMENTS

| | | |
|---|---|---|
| 0 120 191 | 10/1984 | European Pat. Off. . |
| 0 339 462 | 11/1989 | European Pat. Off. . |
| 0 391 387 | 10/1990 | European Pat. Off. . |
| 0 503 945 | 9/1992 | European Pat. Off. . |
| 0 512 596 | 11/1992 | European Pat. Off. . |
| 39 22 051 | 1/1991 | Germany . |
| 42 09 150 | 9/1992 | Germany . |
| 1431186 | 4/1976 | United Kingdom . |
| 2 200 957 | 8/1988 | United Kingdom . |

OTHER PUBLICATIONS

Atz Automobiltechnische Zeitschrift, Bd. 94, Nr. 9, Sep. 1992, Suttgart de Seiten 428–438 Welter et al 'Die Adaptive Getriebesteuerung fur die automatikgetriebe der BMW Fahrzeuge mit Zwolfzylindermotor' siehe Seite 432, linke Spalte, Absatz 2.2—Seite 435, linke Spalte, Absatz 2.3.4; Abbildungen 3–5, 8–11.

Patent Abstracts of Japan vol. 13, No. 567 (M–908) 15. Dec. 1989 & JP, A, 01 238 748 (Mitsubishi Electric Corp) 22. Sep. 1989 siehe Zusammenfassung.

*Primary Examiner*—Tan Q. Nguyen
*Attorney, Agent, or Firm*—Davis and Bujold

[57] ABSTRACT

A process is proposed for controlling an automatic transmission (3), in which at least one of the weighted values: selector lever activity, excess engine torque, curve radius and brake activity determines a first parameter (K1), the driving activity. Besides the first parameter (K1), a second parameter (K2) determines the selection of a shift characteristic field (31) among a plurality of shift characteristic fields. The second parameter (K2) is determined according to a driving state: city traffic (27), trailering (28) and mountain driving (29).

18 Claims, 3 Drawing Sheets

| CITY | MOUNTAIN | TRAILERING | DRIVING STATE |
|---|---|---|---|
| 0 | 0 | 0 | NORMAL |
| 0 | 0 | 1 | TRAILERING |
| 0 | 1 | 0 | MOUNTAIN |
| 0 | 1 | 1 | MOUNTAIN |
| 1 | 0 | 0 | CITY |
| 1 | 0 | 1 | TRAILERING |
| 1 | 1 | 0 | MOUNTAIN |
| 1 | 1 | 1 | MOUNTAIN |

| DRIVING STATE | DRIVING ACTIVITY | | | | |
|---|---|---|---|---|---|
| | 1 | 2 | 3 | 4 | 5 |
| CITY | 1 | 1 | 2 | 2 | 2 |
| NORMAL | 1 | 2 | 3 | 4 | 5 |
| TRAILERING | 1 | 3 | 5 | 5 | 5 |
| MOUNTAIN | 3 | 3 | 3 | 4 | 5 |

PROCESS FOR CONTROLLING AN AUTOMATIC GEARBOX

The invention concerns a process for controlling an automatic transmission according to the preamble of the first claim.

In an automatic transmission, a shift is started when a shifting characteristic is exceeded. The shifting characteristics are, for instance, a function of vehicle speed and of a position of the throttle valve. The driver usually can choose by pressing a key from three shifting programs, for instance.

DE 39 22 051 A1 has disclosed a process for control of an automatic transmission. In said publication is described how actual vehicle parameters determine a first parameter, the driving activity. The actual vehicle parameters are: engine speed, a throttle valve position, diagonal acceleration, vehicle speed and derived therefrom a longitudinal acceleration or longitudinal deceleration. The driving activity is selected from one of five shifting programs. It is disadvantageous that certain driving states are not taken into account.

This invention is based on the problem of providing a shifting system which reacts variably to specific operating conditions.

The problem is solved, according to the invention, by the fact that the driving activity is formed from at least one of the following weighted values: selector lever activity, excess engine torque, curve radius and brake activity. In comparison to the prior art, it is advantageous that the value of diagonal acceleration is eliminated. A curve radius is used instead of the diagonal acceleration. The curve radius results from a difference of, such as four, wheel speeds or a steering angle and the vehicle speed. By including the curve downshifts in curves, which are critical to safety, are effectively prevented.

A high selector lever activity characterizes a driver who intentionally reacts manually to shifting points in order to obtain an improved acceleration behavior or utilize braking action of the engine. A high excess engine torque characterizes a touring type of driver. The excess engine torque results from the difference of engine torque and the torque needed to overcome the resistance forces. The braking activity describes the period of time in which a driver neither accelerates nor brakes. This period of time begins with the change from traction to coasting and terminates with actuation of the brake. A longer period of time distinguishes a driver with a settled mode of driving. A shorter period of time identifies a pleasure driver.

In the development of the invention it is suggested that the shift program, in addition, be selected according to a second parameter. Said second parameter is composed of the driving state—city traffic, mountain driving and trailering.

In city traffic the full power of the engine is not always required in powerful engines. City traffic, with its own parameter, offers the advantage that the consumption is optimized. This is obtained, for instance, by starting the vehicle in second gear. The creep inclination of an automatic transmission is also hereby reduced. An additional step for reducing consumption is disconnection of a cylinder.

In the processes hitherto known only increased tractional resistance is detected. An identification of great tractional resistance, in mountain driving and/or trailering, offers the advantage of it being possible to react thereto by different shifting programs. In mountain driving, the transmission shifts to the next higher gear ratio at high speeds of the vehicle. Swinging shifts are thereby prevented in the case of small load positions. A swinging shift occurs when, with a constant load position, the traction of the engine after an upshift is less than the sum of the tractional resistance forces. The vehicle no longer accelerates, and the speed of the vehicle diminishes. It diminishes until exceeding a shifting characteristic for a downshift. The transmission shifts to the next lower gear ratio. Since the traction in this gear ration is greater than the tractional resistance forces, the vehicle again accelerates. It accelerates until again exceeding the shifting characteristic for the upshift. This swinging between gears is felt as unpleasant. When trailering, the hysteresis between upshift and downshift characteristics is increased. The advantage here is that, on one hand, the acceleration behavior is thereby improved and, on the other, the sliding action of the trailer after shifting to a lower gear ration is reduced.

In the development of the invention, it is proposed that the driving states—city traffic, mountain driving and trailering—be input values for an evaluation table. The second parameter is then determined by said evaluation table. This offers the advantage that when two driving states appear simultaneously, priority is given to one. Thus, for instance, in city traffic the driving state trailering is set simultaneously with trailering as the second parameter.

In the development of the invention, it is further proposed that, in the case of full depression of the accelerator pedal with activation of a kick-down switch, transfer to a power-oriented shift program results. This can absolutely result by always changing to the shift program having the highest shift points. Another possibility is a gradual transition such as by two steps.

Together with the control of the shifting points sought by selection of a shift program by both parameters, it is also desirable to reduce the frequency of shifting.

This is obtained by not shifting to the next higher gear ration when the gradient of the throttle valve change is negative and the total exceeds a desired value. The shift is not effected until a first time period has expired after a traction operation has been detected. With the detection of cornering, the upshift likewise does not take place. The driving state cornering is set when a curve radius exceeds a first desired value. The curve radius is calculated from a difference in wheel speeds, such as four, or a steering angle. If the parameter falls below a second desired value the cornering is reset. After the lapse of a second time period the upshift is allowed.

Another possible solution, according to the invention, consists in that the automatic transmission, in mountain driving, effects a shift to the next lower gear ratio. The advantage of this is that the brake effect of the engine is used without the driver having manually to select a lower gear via the selector lever. The mountain driving state is set when a throttle valve signal is zero or near zero, no brake is actuated and an actual vehicle acceleration at a first moment t1 and a second moment t2 is greater than a desired value. This desired value is a function of engine speed and of the actual gear. The desired value represents a deceleration of the vehicle when coasting on a flat road and is found out, for instance, from tests. A downshift to the next lower gear ratio takes place when the brake is actuated by the driver and a sum exceeds the desired value. The sum is found from two summands: the first summand results from the difference of actual vehicle acceleration at the moment t1 minus the desired value at the moment t2. The second summand likewise results from the difference of the actual acceleration of the vehicle at the moment t2 minus the desired value at the moment t2. It is further proposed that the summands be weighted with each other. If the driver actuates the accelerator pedal and a throttle valve value is greater than a desired value, such as 10%, then an amount is periodically subtracted from the sum. The amount results from two summands weighted together. The first summand results from the difference of the vehicle acceleration at the moment t3 minus the desired value at the moment t3. The second summand results from the difference of the vehicle acceleration at the moment t4 minus the desired valve at the moment t4. If the sum falls below a limiting value, the amount is reset to zero and returned to the initial position of the selector lever. The mountain driving state is hereby reset.

In the development of the invention, it is proposed that the downshift take place when a brake deceleration exceeds a desired value. Said desired value is, on one hand, gear-dependent and, on the other, a function of a deceleration time. The deceleration time begins after the throttle valve signal is zero or near zero and terminates when the brake is actuated. The advantage resulting from this is to obtain a deceleration need of shorter duration as a result of the engine brake effect and to be better able to accelerate away from the curve on the curve end.

An embodiment of the control process is shown in the drawings.

Figure 1:
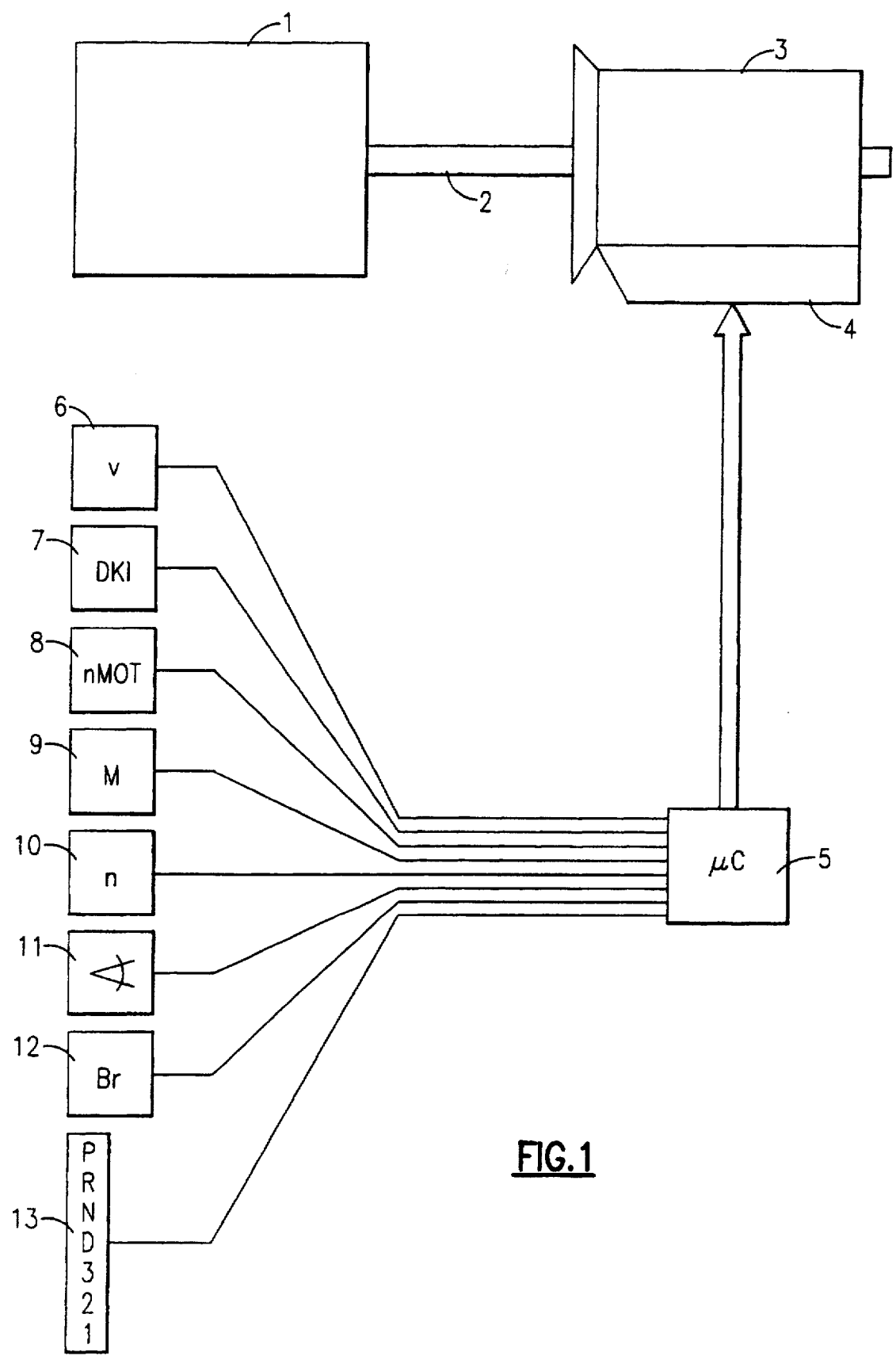
FIG. 1 is a system diagram of an automatic transmission.

FIG. 1 shows an automatic transmission 3 connected by an input shaft 2 with an engine 1. The automatic transmission 3 contains clutches, not shown, which are actuated by electromagnetic valves, not shown, which are housed in a hydraulic control unit 4. Electromagnetic pressure regulators, not shown, are also housed in said hydraulic control unit 4. The electromagnetic valves and electromagnetic pressure regulators are controlled by an electronic control unit 5. The electronic control unit 5 contains the usual components of a microprocessor system such as input and output devices, working memory and a processor. Input values for the electronic control unit 5 are vehicle speed 6, a throttle valve signal 7, engine speed 8, engine torque 9 or a signal from which the engine torque can be calculated, for instance, injection time, four wheel speeds 10, a steering angle 11, a signal from a stop light switch or a brake pressure switch 12, a signal from a vehicle position switch 13 and a signal of a kick-down switch, not shown.

Figure 2:
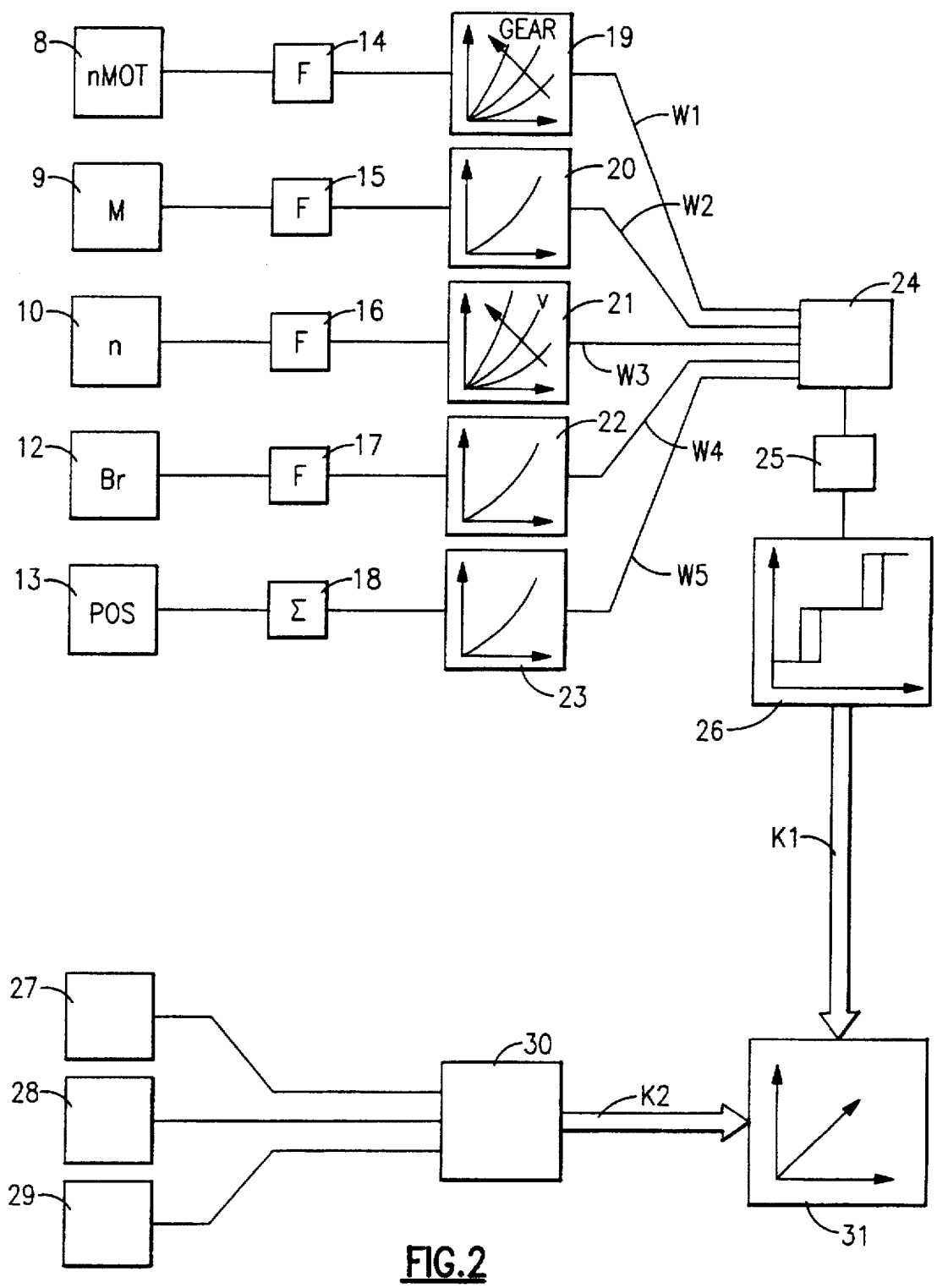
FIG. 2 is a block gearshift diagram for selection of a shift characteristic field.

A block diagram, for selection of a shift characteristic field 31, is shown in FIG. 2. The shift characteristic field 31 is selected from the two parameters: K1, the driving activity, and a second parameter K2, the driving state. Input signals for the parameter K1 are engine speed 8, engine torque 9, four wheel speeds 10, a signal from a stop light switch or a brake pressure switch 12 and a signal from a driving position switch 13. The engine speed 8 is digitally filtered by filter 14. The filtered engine speed is gear-dependently weighted over a characteristic field 19 and converted to a first value W1. The engine torque 9 is digitally filtered by filter 15 and therefrom, a second weighted value W2 is determined via a characteristic field 20. A curve radius is calculated from speeds of the four wheels 10 by differential formation. The curve radius likewise can be calculated from a steering angle 11. The curve radius is digitally filtered by filter 16 and is weighted, via a characteristic field 21, and converted to a third value W3. The stop light signal or the brake pressure signal 12 is used for timing the brake activity. The timing starts with an acceleration change of the vehicle from traction to coasting. It terminates when the driver actuates the brake and the stop light signal is set or the brake pressure exceeds a desired value. The brake activity is digitally filtered by filter 17. The output value of the digital filter 17 is weighted, via a characteristic field 22, and converted to a fourth value W4. The signal of a driving position switch 13 is fed to an adding machine 18. In the adding machine 18, the number of changes in driving position are added up. A calculated amount is periodically reduced, for instance, by subtracting a fixed amount or by multiplying the calculated amount by a factor <1. The calculated amount is weighted, via a characteristic field 23, and converted to a value W5. The magnitude of the values W1 to W5 are between 0 and 1. The maximum value is selected, in the function block 24, from the W1 to W5 values and then filtered by filter 25. The output parameter of the filter 25 is a value between 0 and 1. Via a characteristic line 26, a first parameter K1, the driving activity, is coordinated with said values. The parameter K1 can assume a magnitude between 1 and 5. A lesser value means a consumption-optimized mode of driving, a higher value means a power-oriented mode of driving. The characteristic line 26 is subject to hysteresis. Thereby the parameter K1 is prevented from constantly swinging back and forth upon slight changes of the input values.

The driving state—city traffic 27, trailering 28 and mountain driving 29—are input values for the second parameter K2. An input condition for the city traffic 27 driving state is that the vehicle speed is below a generally legal speed limit within the village limits. The number of starting operations, braking operations and load changes are counted under said speed range. A load change is a change in the acceleration of the vehicle from traction to coasting and vice versa. If the sum exceeds a first limiting value, the city traffic driving state is set. The sum is periodically reduced as a protection against overflow. This occurs, for instance, by a fixed amount being subtracted or by multiplying the calculated amount by a factor <1. The city traffic driving state 27 is reset as soon as the sum is below a second limiting value. The driving states, trailering 28 and mountain driving 29, are explained in relation to FIG. 3.

The three driving states, 27 to 29, are input values for an evaluation table 30. The input values are logically combined by the evaluation table 30. From the three driving states 27 to 29, eight input combinations for the evaluation table 30 result. In the evaluation table 30, four possible initial states of the second parameter K2 are coordinated with the eight input combinations. An embodiment of the evaluation table 30 is shown in FIG. 4.

Figures 3, 4, 5:
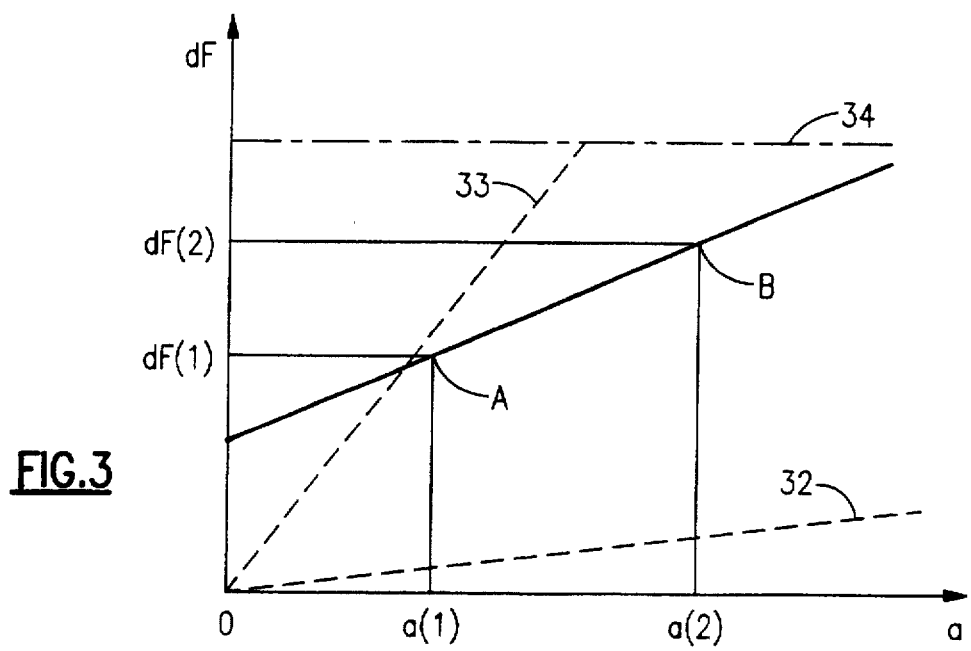
FIG. 3 is a diagram for detecting the driving state trailering and/or mountain driving.
FIG. 4 is an evaluation table.
FIG. 5 is a shift characteristic field.

An embodiment according to which increased tractional resistance is discerned in mountain driving and/or trailering is shown in FIG. 3. In the hitherto known processes only increased tractional resistance is detected. The traditional resistance is calculated in a stationary driving state. A stationary driving state exists when the vehicle speed is higher than a limiting value such as 10 km/h, the brakes are not actuated and without shifts. An excess input power is calculated at a first moment t1. The excess input power is composed of the actual input power of the engine minus a sum of different tractional resisting forces on a flat road. The sum of the tractional resisting forces results from transmission, rolling, air and acceleration resistance forces. The individual resistance forces are composed of constants specific to the vehicle and the vehicle speed 6 at the moment t1. The engine torque can be present as genuine information in an electronic control unit 5, for instance, from an engine control, or it can be calculated. The torque calculation of the engine results, in a manner known per se, by the fact that the electronic control unit 5 calculates the torque by a characteristic field, from an engine speed signal 8 and a signal proportional to injection time. The excess input power at the moment t1 is shown by point A with the coordinates a(1) and dF(1). Thereafter, the excess input power at a second moment t2 is calculated in the same manner. This is shown by point B with the coordinates a(2) and dF(2). Both points A and B are interconnected by a mathematical relationship. A straight line is shown. The slope of the straight line is synonymous with the weight of the vehicle. The coordinate value on the point a=0 is synonymous with the product from the vehicle weight by ground acceleration by sine of the lead angle of the vehicle.

The coefficients thus obtained are tested for plausibility. The range of the minimum and maximum slope of the straight line is determined by the vehicle weight. The dead weight of the vehicle determines the lower limit, broken line 32. The admissible total weight of the vehicle plus maximum admissible trailer load forms the upper limit, broken line 33. The range of the minimum and maximum coordinate values on the point a=0 is determined by the climbing power of the vehicle. A slope from zero or near zero percent forms a lower limit. The lower limit is formed by the abscissa. A maximum possible climbing power of the vehicle forms the upper limit, dotted line 34.

A adaptation of the weight detected from the slope of the straight line compared with the actual weight is obtained by a correction factor. The correction factor is obtained from a comparison of two successive weighted calculations. This is admissible since the weight ratios do not change during driving. Thereafter, only the vehicle ascent is tested during the driving operation (ignition equal "An").

In FIG. 5, an embodiment according to which the shift characteristic field 31 is selected from five possibilities is shown. The input values are a first parameter K1, the driving activity, and a second parameter K2, the driving state. The first parameter K1 can assume values of from 1 to 5. The driving state is classified according to the driving state—city traffic, normal operation, trailering and mountain driving. The shift characteristic fields 1 to 5 coordinated with the two parameters cover the range from a consumption-optimized to a power-optimized mode of driving.

REFERENCE NUMERALS 1 engine
2 input shaft
3 automatic transmission
4 hydraulic control unit
5 electronic control unit
6 vehicle speed signal
7 throttle valve signal
8 engine speed signal
9 engine torque
10 four wheel speeds
11 steering angle
12 brake signal
13 gear selection switch
14 digital filter
15 digital filter
16 digital filter
17 digital filter
18 adding machine
19 characteristic field
20 characteristic field
21 characteristic field
22 characteristic field
23 characteristic field
24 function block
25 total filter
26 characteristic field
27 city traffic
28 trailering
29 mountain driving
30 evaluation table
31 shift characteristic field
32 lower limit, vehicle dead weight
33 upper limit, allowable total weight+maximum allowable trailer load
34 maximum possible climbing power
K1 first parameter, driving activity
K2 second parameter, driving state

We claim:

1. A process for controlling an automatic transmission (3) of a vehicle having clutches controlled by an electronic control unit (5), said electronic control unit (5), during operation, receiving sensor signals (6 to 13), said process comprising the steps of:

determining, from said sensor signals (6 to 13), a first parameter (K1) being indicative of a driving activity, said first parameter (K1) being determined from a weighted value of selector lever activity, a weighted value of excess engine torque, a weighted value of curve radius and a weighted value of brake activity;

determining a second parameter (K2) being indicative of a driving state, and said second parameter (K2) being determined from an evaluation table (30) containing a city traffic driving state (27), a trailering driving state (28) and a mountain driving state (29);

selecting a shifting program, from a plurality of possible shifting programs, based upon said first parameter (K1) and said second parameter (K2);

totalling each start operation of the vehicle, each braking operation of the vehicle and each load change of the vehicle to generate a totalled sum;

periodically reducing the totalled sum until reaching a minimum lower limit of zero; and setting the driving state to the city traffic driving state (27) as soon as the totalled sum exceeds a first limiting value.

2. The process according to claim 1, wherein the step of periodically reducing the totalled sum comprises the step of subtracting a fixed amount from the totalled sum until the totalled sum reaches the minimum lower limit of zero.

3. The process according to claim 1, wherein the step of periodically reducing the totalled sum comprises the step of multiplying the totalled sum by a factor less than 1 until the totalled sum reaches the minimum lower limit of zero.

4. The process according to claim 1, further comprising the step of resetting the driving state to the city traffic driving state (27) as soon as the totalled sum falls below a second limiting value.

5. The process according to claim 1, further comprising the step of providing a first range and a second range for differentiating between the mountain driving state (29) and the trailering driving state (28).

6. The process according to claim 5, further comprising the step of setting a lower limit (32) of said first range as a weight of the vehicle and setting an upper limit (33) as a total admissible weight of the vehicle plus a maximum admissible trailer load.

7. The process according to claim 5, further comprising the step of setting a lower limit of said second range by a slope of zero or near zero percent and setting an upper limit (34) as a maximum possible climbing power of the vehicle.

8. A process according to claim 1 further comprising the step of establishing a first limiting value and a second limiting value such that when said totalled sum falls between said first and second limiting values the city driving state is selected.

9. A process according to claim 8 further comprising the step of periodically reducing said totalled sum to ensure said second parameter is indicative of the city driving state.

10. A process according to claim 9, further comprising the step of calculating the totalled sum only when vehicle speed is maintained below a predetermined speed.

11. A process according to claim 1 further comprising the steps of:

establishing a power band of engine power verses vehicle acceleration;

determining a first range and a second range within said power band, with said first range corresponding to the trailering driving state and said second range corresponding to said mountain driving state, and both said first range and said second range having an upper and a lower limit.

12. A process according to claim 11, further comprising the step of forming the lower limit of said first range by the weight of the vehicle and the upper limit by the weight of the vehicle plus a maximum allowable trailer load of the vehicle.

13. A process according to claim 11, further comprising the step of defining the lower limit of said second range by a power output of approximately 0 and the upper limit by the power output defining a maximum possible climbing power of the vehicle.

14. A process according to claim 11, further comprising the steps of:

ascertaining an excess first input power value and an excess second input power value as a function of engine power versus vehicle acceleration at respective first and second times; and comparing the excess first input power value and excess second input power value to determine whether a steady state driving condition exists.

15. A process according to claim 14, further comprising the step of calculating the excess input power by a difference of momentary input power of the engine minus a sum of the tractional resistance forces on a level road, with the resistance forces being transmission, rolling, air and acceleration forces.

16. A process according to claim 14, further comprising the step of coordinating the excess input power values within said power band.

17. A process according to claim 14 further comprising the step of using said first excess input power value and said second excess input power value to define a pair of coordinates representing power input verses vehicle acceleration with said pair of coordinates defining a straight line.

18. A process according to claim 17 further comprising the step of determining a specific driving state by parameters of said straight line.

* * * * *